US012515800B2

(12) United States Patent
Davis et al.

(10) Patent No.: US 12,515,800 B2
(45) Date of Patent: Jan. 6, 2026

(54) AIRCRAFT HEATED SEAT

(71) Applicant: Textron Aviation Inc., Wichita, KS (US)

(72) Inventors: David Wayne Davis, Wichita, KS (US); Joshua Lawrence Bell, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 268 days.

(21) Appl. No.: 18/450,843

(22) Filed: Aug. 16, 2023

(65) Prior Publication Data
US 2025/0058877 A1 Feb. 20, 2025

(51) Int. Cl.
*A47C 31/00* (2006.01)
*B60N 2/56* (2006.01)
*B64D 11/06* (2006.01)

(52) U.S. Cl.
CPC ........ *B64D 11/0626* (2014.12); *B60N 2/5685* (2013.01)

(58) Field of Classification Search
CPC .............................. B60N 2/02246; B60N 2/56
USPC ................ 297/217.3, 452.48, 180.1
See application file for complete search history.

(56) References Cited

U.S. PATENT DOCUMENTS

| | | | |
|---|---|---|---|
| 6,848,742 B1 * | 2/2005 | Aoki .................... | B60N 2/5635 454/120 |
| 7,134,715 B1 * | 11/2006 | Fristedt ................... | B60N 2/56 297/180.12 |
| 11,111,022 B2 | 9/2021 | Montagna et al. | |
| 11,161,437 B2 | 11/2021 | Wilson | |
| 11,180,062 B2 | 11/2021 | Beaurepaire et al. | |
| 11,627,816 B2 | 4/2023 | Bullard et al. | |
| 2003/0214160 A1 * | 11/2003 | Brennan ............... | B60N 2/5635 297/180.14 |
| 2005/0099043 A1 * | 5/2005 | Kim ..................... | B60N 2/5685 297/217.3 |
| 2005/0184565 A1 * | 8/2005 | Weiss ................... | B60N 2/5635 297/217.3 |
| 2007/0063551 A1 * | 3/2007 | Gasic .................. | B60N 2/5635 297/180.1 |
| 2007/0290533 A1 * | 12/2007 | Josefsson ............. | B60N 2/5685 297/180.12 |
| 2010/0146700 A1 * | 6/2010 | Wolas .................... | A47C 7/748 5/423 |
| 2010/0301642 A1 * | 12/2010 | Negrini ................ | B60N 2/5692 297/180.11 |
| 2011/0121618 A1 * | 5/2011 | Fischer ............. | B60R 21/01532 297/180.12 |
| 2015/0097399 A1 | 4/2015 | Vue | |
| 2016/0052432 A1 * | 2/2016 | Lafferty ............... | B60N 2/5685 297/180.12 |
| 2018/0228295 A1 * | 8/2018 | Rijkschroeff ........... | A47C 1/12 |

(Continued)

*Primary Examiner* — Shin H Kim
(74) *Attorney, Agent, or Firm* — Avek IP, LLC

(57) ABSTRACT

A heated seat for an aircraft includes a heating element disposed on a cushioning material and overlayed by an upholstery. The heating element includes a flexible base and a plurality of thin and flexible heating coils that conform to the seat shape such that no cushioning material is applied between the heating element and the upholstery. By providing direct contact between the heating element and the upholstery, smaller heating elements requiring less electrical power may be used to sufficiently heat the seat compared with traditional heating elements.

17 Claims, 9 Drawing Sheets

(56) References Cited

U.S. PATENT DOCUMENTS

2020/0231075 A1\* 7/2020 Roman ................ B60N 2/5825
2020/0255151 A1   8/2020 Schlosser et al.
2025/0058877 A1\* 2/2025 Davis ................ B64D 11/0647

\* cited by examiner

AIRCRAFT HEATED SEAT

BACKGROUND OF THE INVENTION

1. Field

The disclosed embodiments relate generally to the field of aircraft seating.

More specifically, the disclosed embodiments relate to aircraft seat heating.

2. Description of the Related Art

It is known for an aircraft to include heated seats. For example, in U.S. Pat. No. 11,111,022 to La Montagna et al. a heating system for an aircraft seat is described using thermoelectric elements. The thermal surfaces including the thermoelectric elements are controllable to function to a user's liking.

It is also known for an aircraft to have conditioned seats using a Venturi device. For example, in U.S. Pat. No. 11,161,437 to Wilson et al. describes a Venturi device including a compressed air system which blows air across ventilation zones within an aircraft seat to heat or cool the seat. The airflow is controllable by a user to allow the seat to have a desired temperature.

It is also known for an aircraft to have heated jump seats heated by resistive heating elements. For example, in U.S. Patent Application Publication No. 2015/0097399 to Vue describes a heating system for an aircraft jump seat. The heating system is activated or deactivated based on the temperature of the environment surrounding the jump seat.

It is also known for an aircraft to have heated seats heated using an integrated heating system. For example, in U.S. Patent Application Publication No. 2020/0255151 to Schlosser et al. describes a heating system with gas cushions being equipped with heating elements which may be controlled or regulated.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In an embodiment, a heated seat for an aircraft includes: a cushioning material; a heating element disposed directly on the cushioning material; an upholstery disposed directly on the heating element, wherein the heated seat lacks the cushioning material between the heating element and the upholstery.

In another embodiment, a method of heating a seat includes: providing a cushioning material; disposing a heating element directly on the cushioning material; disposing an upholstery directly on the heating element such that no cushioning material is disposed between the heating element and the upholstery.

In yet another embodiment, a heated seat for an aircraft includes: a bottom portion configured for a user to sit upon and a back portion configured to support the user's back; an outer layer disposed on the bottom portion and the back portion, wherein the outer layer is configured to be exposed for touching the user when seated; an inner layer disposed inside the bottom portion and the back portion; and a middle layer sandwiched between the outer layer and the inner layer, wherein the outer layer includes an upholstery, the middle layer includes a flexible heating element, and the inner layer includes a cushioning material.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
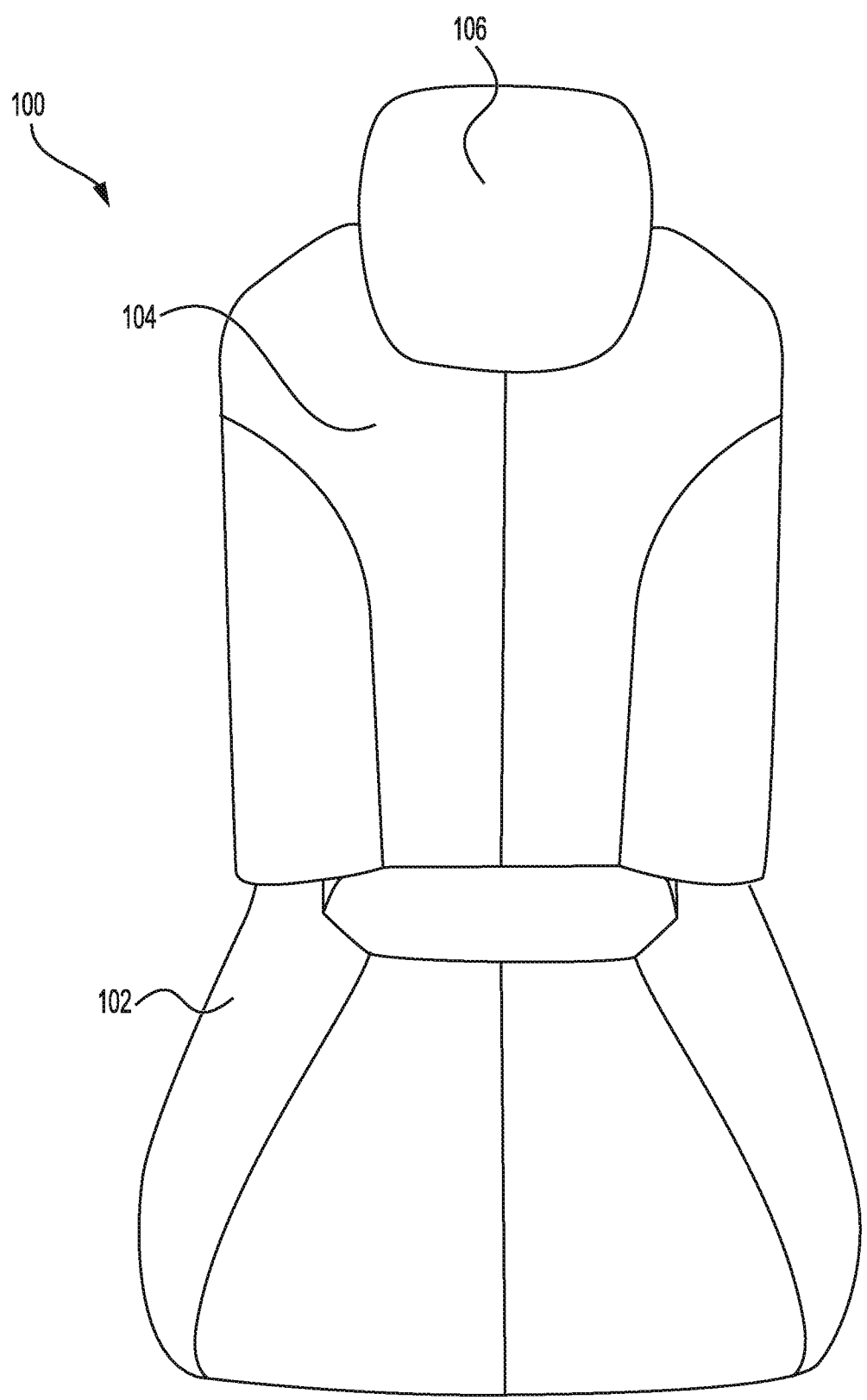
FIG. 1 is a front perspective view of the aircraft heated seat.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide a system and method for heating a seat on an aircraft. Current heated seat arrangements, such as arrangements designed for automobiles, require a large electrical power draw. The high electrical power required for these arrangements is suboptimal and may not be able to be drawn from an aircraft electrical system. High electrical power may be required by a heated seat due to the overall design of the seat. Current heating arrangements are large and bulky and require a thick piece of cushioning material (e.g., foam) to be placed between the heating element and the seat bottom and seat back to cushion the heating elements from the user for comfort. The thick cushioning material requires a larger heating element that draws a large amount of electrical power to heat a surface of the seat bottom/back through the cushioning material. Current arrangements require physical separation of the heating elements from upholstery layer with an interstitial foam layer to reduce visual impact and to keep the upholstery layer from wearing out prematurely due to heating wires causing localized high pressure zones during seat occupancy. For aircraft applications, a heating element is needed which requires less power and takes up less space.

Within embodiments is a system for heating an aircraft seat which includes a 3D printed heating element. The heating element has a slim profile and may be in direct contact with a surface or surfaces of an aircraft seat. The slim profile allows for the heating element to require less amounts of energy and take up less space than other heated seat arrangements because they do not require cushioning material for user comfort. Therefore, the provided heat only needs to heat the upholstery, which is much thinner, has a lower thermal mass, and has a lower insulative capacity (e.g., a lower R value) compared with the cushioning material. The 3D printed heating element lacks tangible or visible issues that other wire heaters cause. The 3D printed heating element weighs less than other heating wires with insulation. The heating elements may be strategically placed at numerous different regions of the aircraft seat to provide optimal comfort for the user. The temperature level of the heating element may also be adjusted by a user to a desired level.

Shown in FIG. 1 is an exemplary aircraft heated seat 100. The aircraft heated seat 100 includes a seat bottom 102, a seatback 104, and a headrest 106. The aircraft heated seat 100 may be fabricated and upholstered with leather, fabric, or numerous different types of materials, and also cushioned with a type of foam or other suitable material to provide comfort for a user. The seat bottom 102 and the seatback 104 as shown in embodiments are separate elements connected together by the aircraft heated seat 100 structure. However, in alternative arrangements, the seat bottom 102 and the seatback 104 may be fabricated and upholstered as a single element. The seatback 104 includes the headrest 106 joined to the upper portion of the seatback 104.

Figure 2:
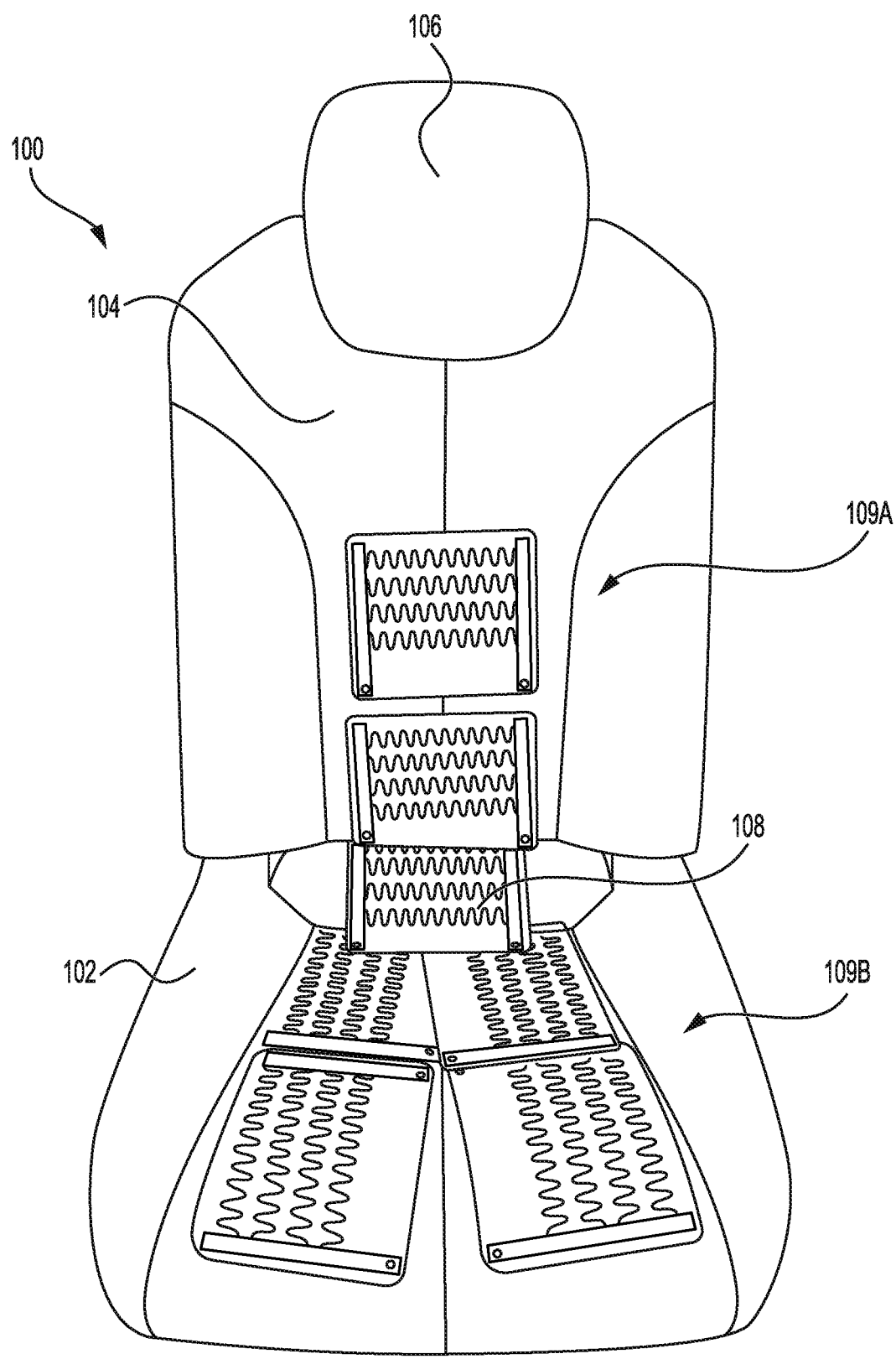
FIG. 2 is a front partially internal perspective view of the aircraft heated seat.
Figure 3:
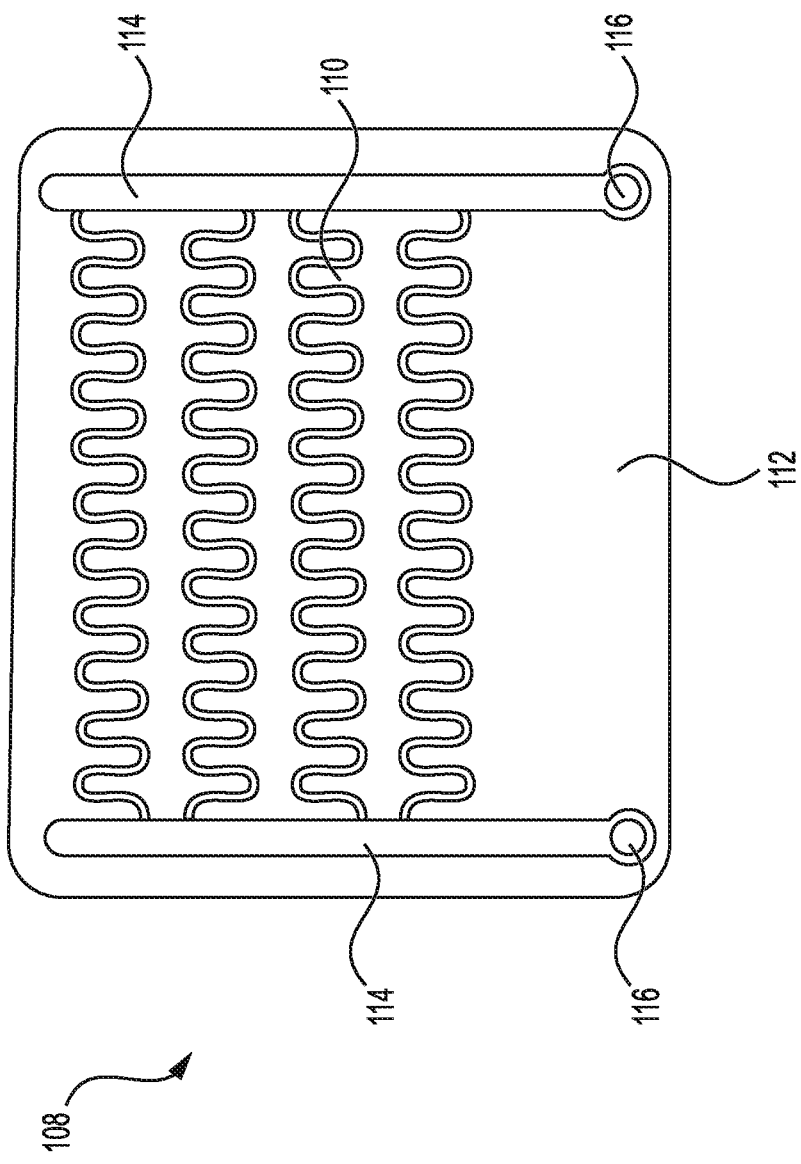
FIG. 3 is a top view of the heating element.

Shown in FIG. 2 is a partial internal view of the aircraft heated seat 100 in which a top layer of the seat is removed to reveal the heating element 108. The heating element 108 may be located immediately beneath the outer fabric of the aircraft heated seat 100 such that the heating element 108 is in direct physical contact with an inner side of the outer fabric. The heating element 108 in embodiments extends from the center region of the seatback 104 downwards towards the seat bottom 102, but may be located in other regions of the seat without departing from the scope hereof. As referenced within embodiments, the heating element 108 refers to a single patch or heating unit, as shown in FIG. 3. In some embodiments, any number of heating elements 108 may be electrically connected together to form a heated region 109 of the aircraft heated seat 100. For instance, in FIG. 2, two heating elements 108 are disposed immediately beneath the outer fabric of the seat back 104 to form a first heated region 109A, and five heating elements are disposed immediately beneath the outer fabric of the seat bottom 102 to form a second heated region 109B. Additionally, in some embodiments, each of the heating elements 108 forming the heated regions 109A, 109B may be wired electrically independent of one another. Independent wiring to each heating element 108 may allow a user to substantially control the temperature of each heating element 108 in the heated regions 109A, 109B independently, and each heating element 108 may be electrically wired to its own independent power supply unit. Each heating element 108 may be connected to its own controller. The controller may be connected to temperature sensors capable of detecting the temperature of the heating element 108. The controller is able to process user feedback and temperature feedback from the sensors to be able to substantially control the temperature of an individual heating element 108 or many heating elements such as those positioned in the heated regions 109A and 109B. In other embodiments one heating element 108 may be configured to form an entire heated region of the aircraft heated seat 100 including within the seat back 102 and seat bottom 104. On the seat bottom 102, the second heated region 109B stretches from the rearward portion of the seat bottom 102 towards the front portion of the seat bottom 102. In embodiments, on the seat bottom 102, the second heated region 109B is positioned to substantially conform to a shape of a user's body while sitting in the aircraft heated seat 100. For example, a first pair of heating elements 108 are immediately adjacent one another in the rearward portion of the seat bottom 102 and a second pair of heating elements 108 are separated towards the front of the seat bottom 102 to conform to a user's legs. In other words, the second heated region 109B splits roughly where a person's legs would be positioned in a seated orientation on the aircraft heated seat 100. The positioning of the heated regions 109A, 109B may be strategic to substantially follow a person's body profile when seated in the aircraft heated seat 100 to optimally provide heat to the user. The heating elements 108 may be located anywhere on the seat bottom 102 and the seatback 104 to form any configuration of heated regions and should not be considered limiting within the scope of this application.

Shown in FIG. 3 is a single heating element 108, in an embodiment. The heating element 108 is shown in embodiments to have a substantially rectangular geometry and includes flexible heating coils 110. The upper surface of the heating element 108 is substantially smooth. The flexible heating coils 110 span across the heating element 108 on top of the surface of a base 112 and are shown in embodiments to have curvature (e.g., an "S" shaped curvature) which increases the contact surface area to the flexible base surface 112. The flexible base 112 may be fabricated from rubber, fabric, glass cloth tape, or an alternative flexible material that is thermally compatible. The flexible base 112 shown in embodiments is 3M™ Glass Cloth Tape, however any type of glass cloth tape may be used to secure or adhere the flexible base 112 to any type of surface. In embodiments four rows of flexible heating coils 110 are shown and each row has a number of curves. The number of rows of flexible heating coils 110 and the number of curves in each row of flexible heating coils 110 may vary and should not be considered limiting within the scope of this application. The shape of the curvature of the flexible heating coils 110 shown in embodiments is an "S" curve type of configuration, but other patterns such as a square wave may be employed without departing from the scope hereof. The flexible heating coils 110 are overlapped on either end of the flexible base surface 112 by busbars 114. The busbars 114 electrically connect the flexible heating coils 110 together and may limit unwanted shifting or movement. Near each side on the bottom region of the flexible base surface 112 are connection points 116. The connection points 116 are able to receive a connection so that the flexible heating coils 110 may receive power from a connected power source. The heating element 108, the flexible heating coils 110, and the busbars 114 may be manufactured using 3D printing techniques and may be fabricated from a thermally and electrically conductive material such as copper, carbon, silver, or other materials with similar properties.

Figure 4:
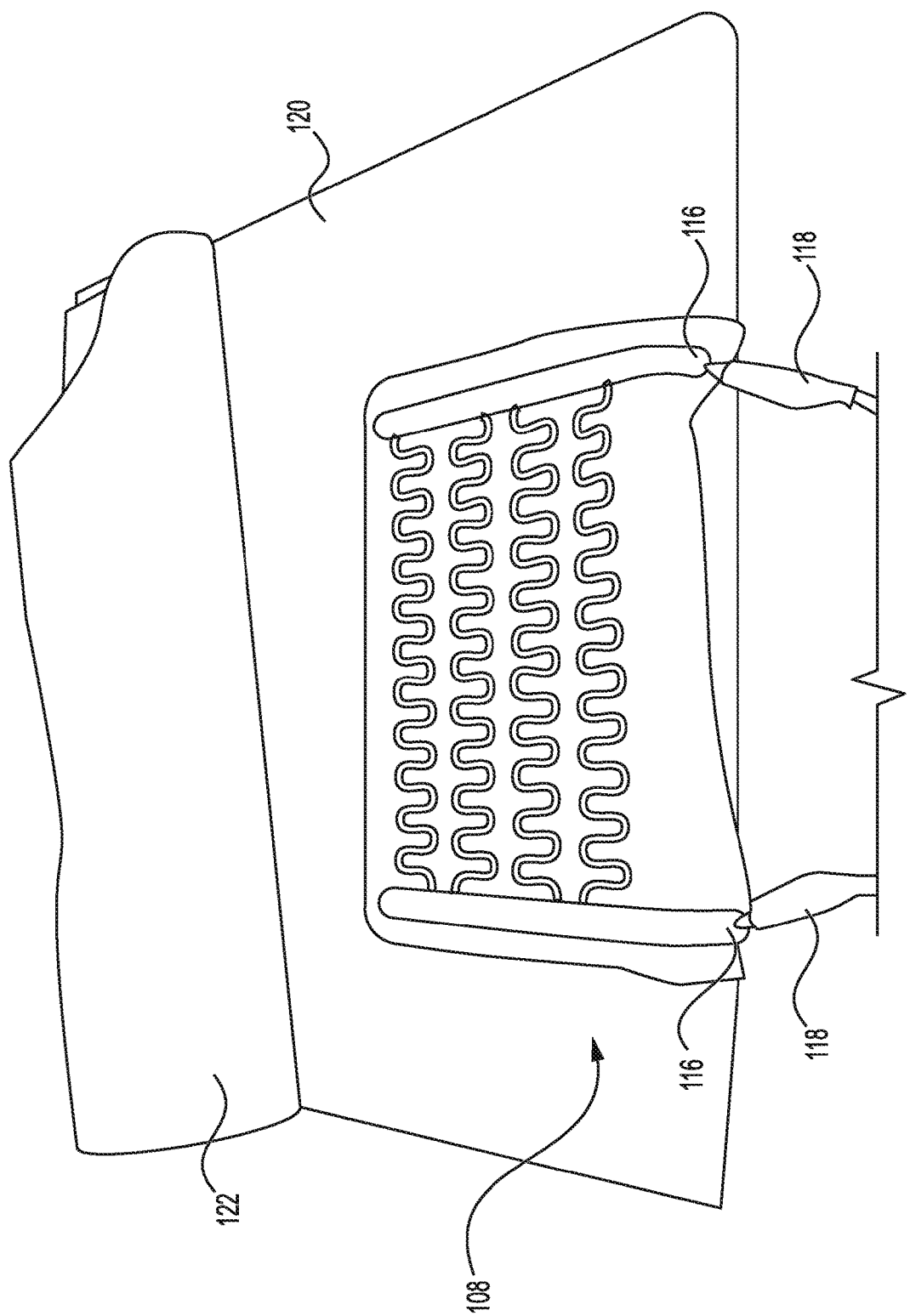
FIG. 4 is a top perspective view of the heating element on a cushion surface.
Figure 7:
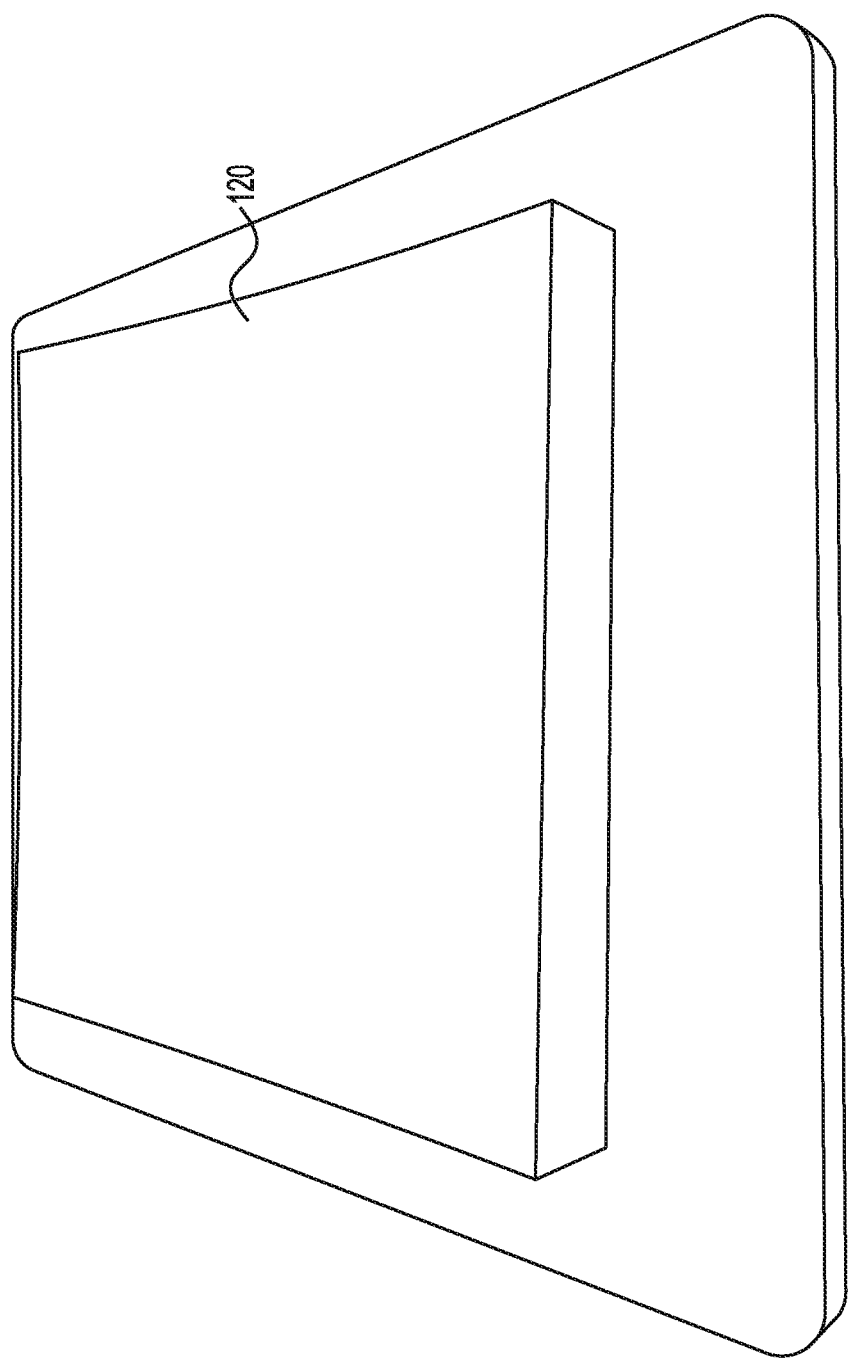
FIG. 7 is a front perspective view of a cushion.

Shown in FIG. 4 the connection points 116 are used to connect the heating element 108 (via the busbars 114) to supply wires 118 which may carry an electrical load to supply the flexible heating coils 110 with electrical energy. The heating element 108 is positioned on the top surface of a cushioning material 120. The cushioning material 120 is shown in FIG. 7 and may be fabricated from a foam or other suitable material to provide comfort for a seated user. The cushioning material 120 may be shaped or molded to form the aircraft heated seat 100 and elements including the seat bottom 102 and the seatback 104. The cushioning material 120 may take on many different forms and should not be considered limiting within the scope of this application. Referring back to FIG. 4, the heating element 108 has a slim profile and protrudes a small distance away from the top surface of the cushioning material 120. In some embodiments the heating element 108 may have a thickness of approximately 0.008 inches. In other embodiments the heating element 108 may have a thickness of 0.004 inches to 0.0016 inches. The slim profile of the heating element 108 allows for a piece of upholstery 122 to be laid directly on top of the heating element 108. This allows for the flexible heating coils 110 to contact the upholstery 122 and transmit heat directly to the upholstery 122 without creating discomfort for a seated user. The upholstery 122 provides an exterior surface of the aircraft heated seat 100 and may be fabricated from leather, fabric, or numerous different types of materials.

Figure 5:
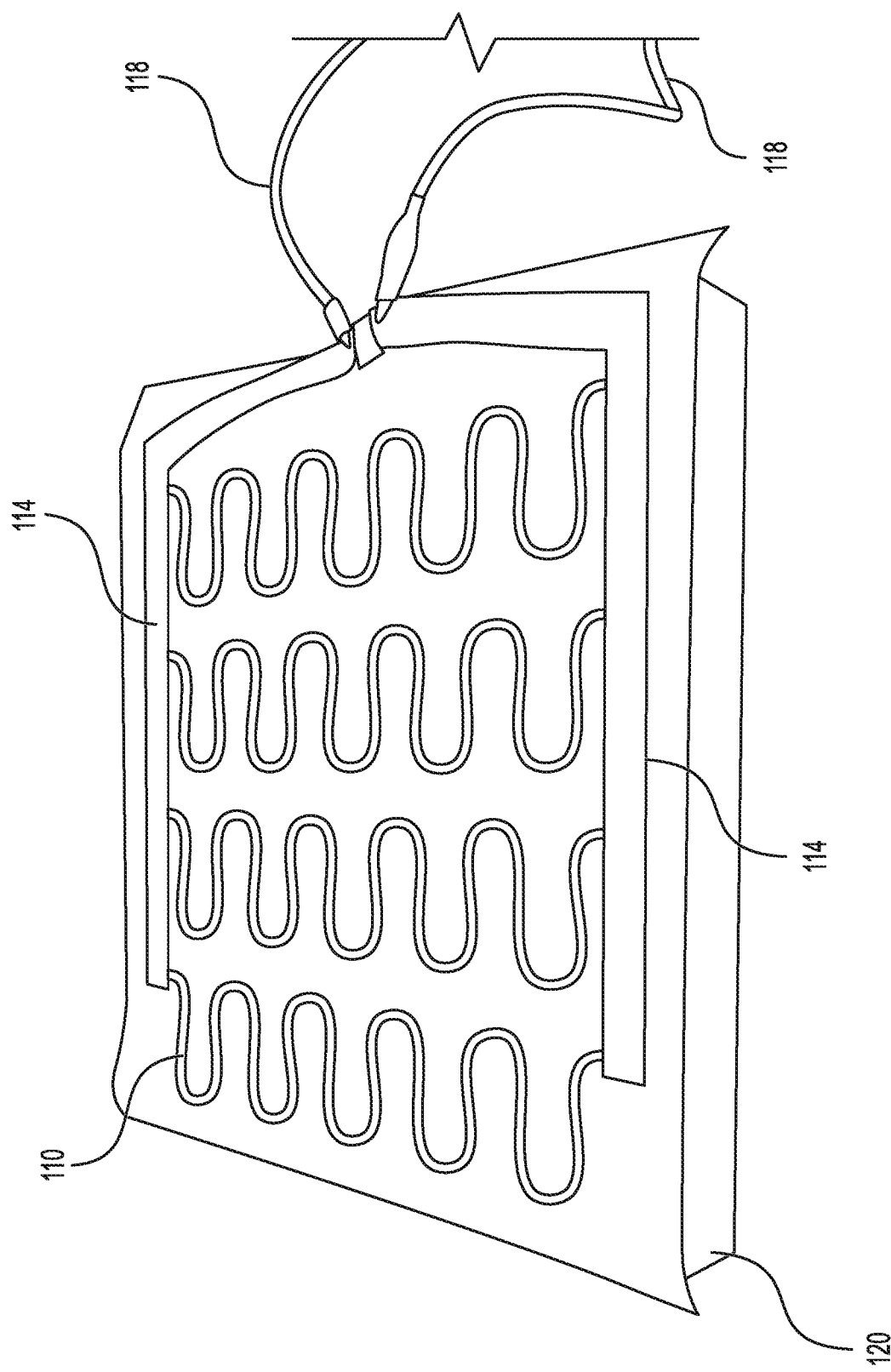
FIG. 5 is an alternate top perspective view of the heating element on a cushion surface.

Shown in FIG. 5 in an alternate view, the heating element 108 is placed directly on a top of a cushion surface 120. The slim profile of the heating element 108 and its components may be seen as the heating element 108 protrudes minimally from the top surface of the cushioning material 120. The supply wires 118 are connected to the heating element 108 to power the flexible heating coils 110.

Figure 8:
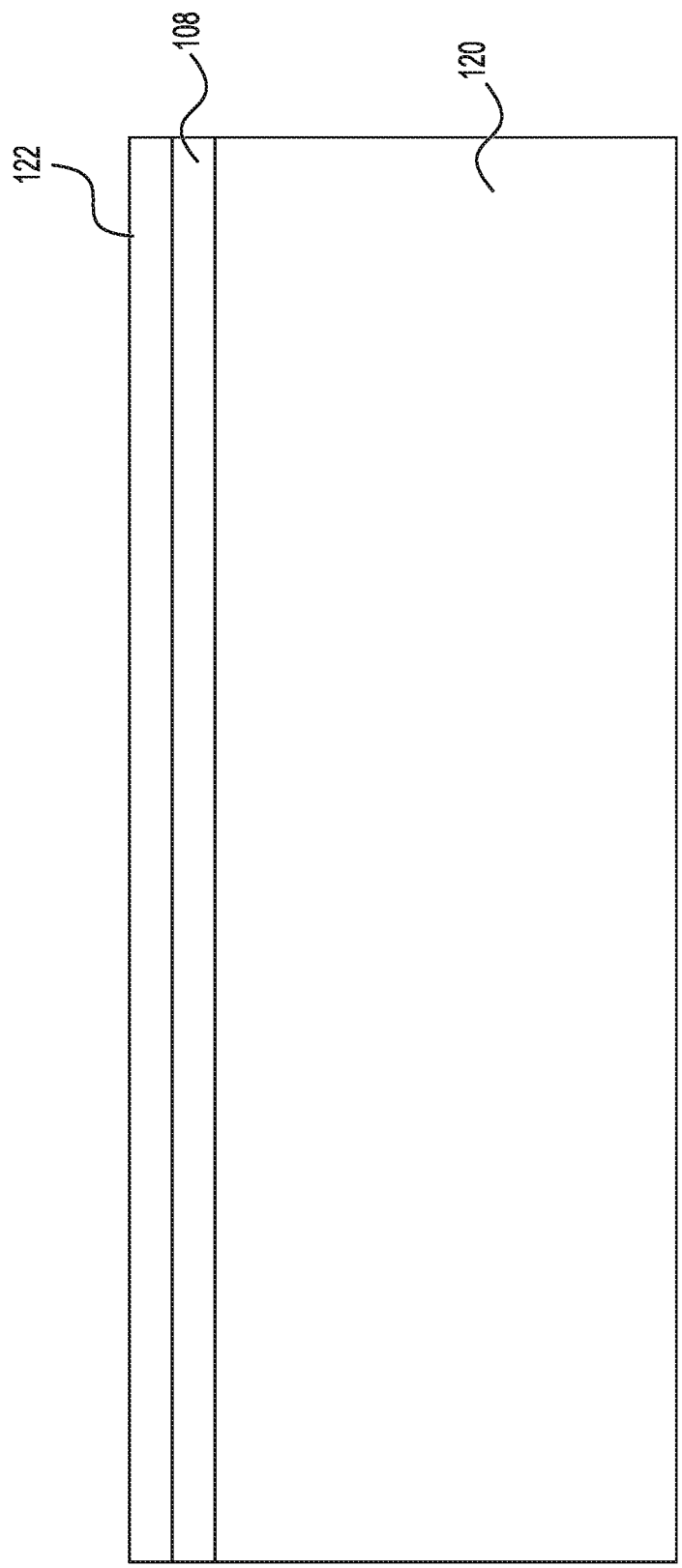
FIG. 8 is a cross sectional view of the cushion, heating element, and upholstery.

Shown in FIG. 8, in a cross-sectional view, the heating element 108 is sandwiched as a middle layer between an inner layer (e.g., the cushioning material 120), and an outer layer (e.g., the upholstery 122). The heating element 108 lays substantially flush with the surface of the cushioning material 120 and has a slim profile to allow for the upholstery 122 to be laid directly on the heating element 108 as shown in embodiments. The slim profile and substantially smooth surface of the heating element 108 allow for the upholstery 122 to be laid directly on top of the heating element 108 without any cushioning therebetween. The direct contact between the heating element 108 and the upholstery 122 reduces the amount of heat output needed from the heating element 108 to adequately heat the upholstery 122.

Figure 6:
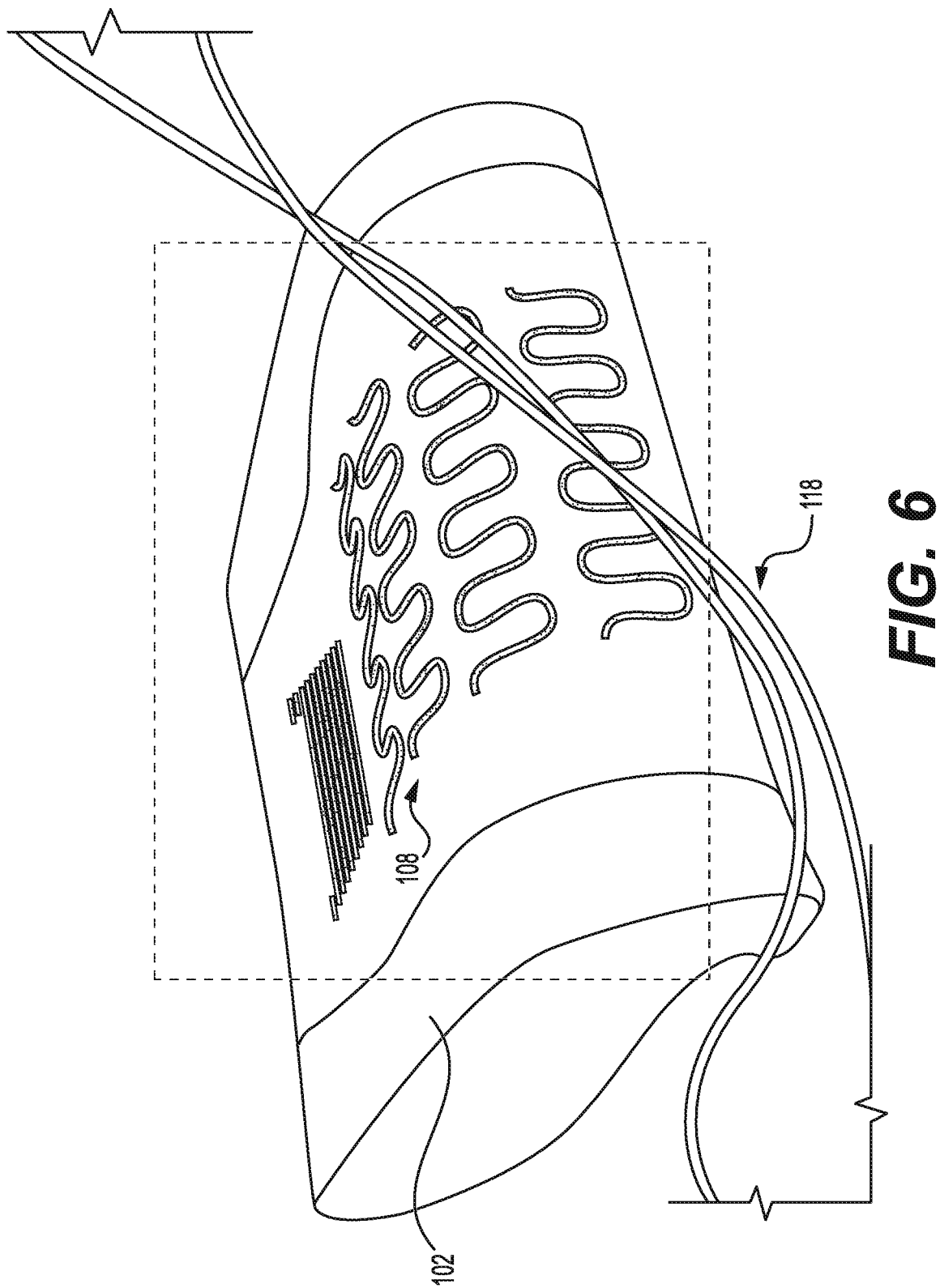
FIG. 6 is a front partially internal perspective view of the seat bottom of the aircraft heated seat.

Shown in FIG. 6 a partially internal view of the seat bottom 102 reveals the heating element 108. The heating element 108 including its components are flexible and are able to substantially conform to a curved surface such as the curvature on the front portion of the seat bottom 102. The slim profile of the heating element 108 allows it to minimally protrude from any surface on which it is placed so that heat radiated from the flexible heating coils 110 travels directly to the upholstery 122 of the aircraft heated seat 100. The slim profile and flexibility of the heating element 108 allows for no additional padding or support to be placed between the heating element 108 and the exterior upholstery 122 layer. In this way, the slimness and flexibility of the heating element 108 do not compromise a passenger's comfort and allow for a passenger to sit substantially on the heating element 108 with only a layer of upholstery 122 separating the heating element 108 from the exterior of the aircraft heated seat 100. The supply wires 118 are shown to provide power to the heating element 108 within the aircraft heated seat 100.

Figure 9:
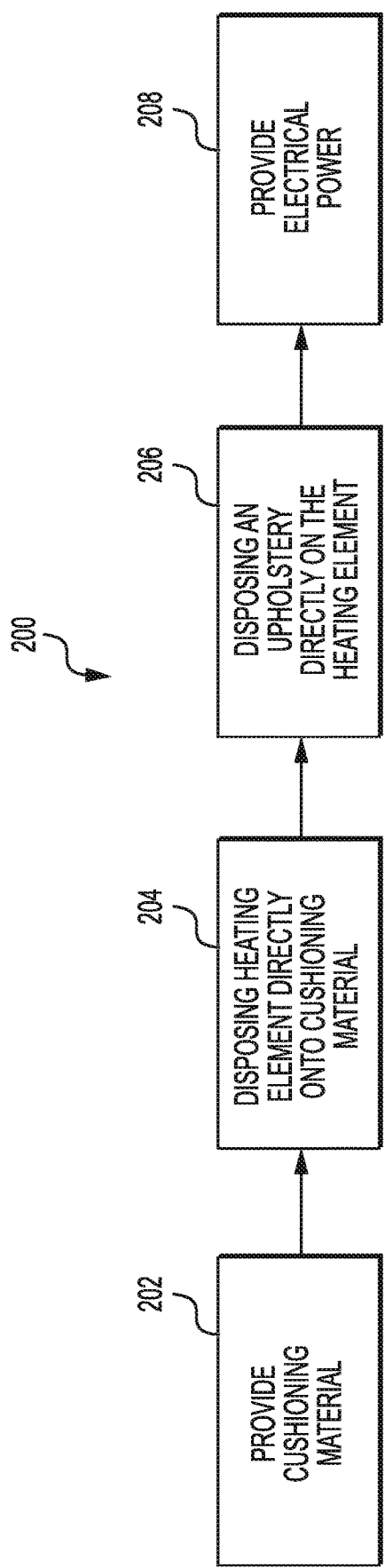
FIG. 9 is a block diagram of a method for heating an aircraft seat.

Shown in FIG. 9 is a method 200 for heating the aircraft heated seat 100. In a first step 202 the cushioning material 120 is provided. The cushioning material 120 may be fabricated from a type of foam and may be shaped to form the seat bottom 102 or the seatback 104. The cushioning material 120 is the inner layer of the aircraft heated seat 100.

In a step 204, the heating element 108 is disposed directly onto the cushioning material 120. The heating element 108 includes the flexible heating coils 110 secured to the flexible base surface 112 using the busbars 114. The heating element is the middle layer of the aircraft heated seat 100. In embodiments, the heating element is manufactured using 3D printing techniques.

In a step 206, the upholstery 122 is disposed directly onto the heating element 108. The upholstery 122 is the outer layer of the aircraft heated seat 100 and is in direct contact on one side with the flexible heating coils 110 of the heating element 108, and on the other side touches a user seated in the aircraft heated seat 100. The heating element 108 is sandwiched between the cushioning material 120 and the upholstery 122. The heating element 108 and the upholstery 122 are able to substantially match the curvature of the cushioning material 120 configured to form the seat bottom 102 or the seatback 104.

In a step 208, voltage may be supplied to the aircraft heated seat 100 using an electrical power supply. The electrical power supply may be communicatively coupled to a user interface so a user may control the electrical power supply for adjusting the heat produced by the heating element 108. In some embodiments the heating element 108 may be adjusted autonomously using a control system with wired or wireless connections to sensors. The sensors are capable of detecting the temperature of the heating element 108 and may communicate with the control system to adjust the electrical power supply being provided to autonomously adjust the temperature of the heating element 108.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A heated seat for an aircraft, the heated seat comprising:
a cushioning material having a curved shape;
a heating element disposed directly on the cushioning material, wherein the heating element comprises a plurality of flexible heating coils configured to bend to match the curved shape of the cushioning material;
an upholstery disposed directly on the heating element, wherein the heated seat lacks the cushioning material between the heating element and the upholstery.

2. The heated seat of claim 1 wherein the plurality of flexible heating coils are disposed on a flexible surface such that the heating element is substantially flexible for matching a curvature of a seat bottom and a seatback.

3. The heated seat of claim 2 comprising a first heating element in the seat bottom and a second heating element in the seat back.

4. The heated seat of claim 3, wherein the cushioning material comprises a first cushion in the seat bottom and a second cushion in the seatback, and the first heating element forms a first heated region disposed on the first cushion and the second heating element forms a second heated region disposed on the second cushion.

5. The heated seat of claim 2 wherein a first pair of heating elements are immediately adjacent one another in the rearward portion of the seat bottom and a second pair of heating elements are separated towards the front of the seat bottom to align with a user's legs.

6. The heated seat of claim 4 wherein the first heated region includes a first connection configured to receive a first voltage from a power supply unit, and the second heated region includes a second connection configured to receive a second voltage from the power supply unit.

7. The heated seat of claim 1 wherein the cushioning material is fabricated from a foam material.

8. The heated seat of claim 1 wherein the upholstery is fabricated from leather.

9. A method of heating a seat, the method comprising:
providing a cushioning material;
disposing a heating element directly on the cushioning material;
shaping the heating element to match a shape of the cushioning material, wherein the heating element comprises a plurality of flexible heating coils; and
disposing an upholstery directly on the heating element such that no cushioning material is disposed between the heating element and the upholstery.

10. The method of claim 9 comprising electrically connecting the flexible coils using a busbar.

11. The method of claim 9 comprising electrically connecting the heating element to an electrical power supply for providing resistive heating of the seat via the heating element.

12. The method of claim 9 comprising communicatively coupling a user interface to the electrical power supply for adjusting an amount of heat produced by the heating element.

13. The method of claim 9 comprising communicatively coupling a controller including at least one temperature sensor to the electrical power supply for autonomously adjusting an amount of heat produced by the heating element.

14. The method of claim 9 comprising forming the heating element using a 3D-printing technique.

15. A heated seat for an aircraft, comprising:
a bottom portion configured for a user to sit upon and a back portion configured to support the user's back;
an outer layer disposed on the bottom portion and the back portion, wherein the outer layer is configured to be exposed for touching the user when seated;
an inner layer disposed inside the bottom portion and the back portion; and
a middle layer sandwiched between the outer layer and the inner layer,
wherein the outer layer comprises an upholstery, the middle layer comprises a flexible heating element, and the inner layer comprises a cushioning material, wherein the flexible heating element includes a plurality of heating coils each having a "S" shaped curvature.

16. The heated seat of claim 15 wherein the flexible heating coils are secured to a flexible material such that the flexible material may be formed to a shape of the inner layer.

17. The heated seat of claim 15 wherein the flexible heating element comprises a substantially smooth outer surface such that no cushioning material is disposed between the heating element and the upholstery thereby reducing an amount of heat that is output from the heating element to heat the upholstery.

* * * * *